Figure 1:
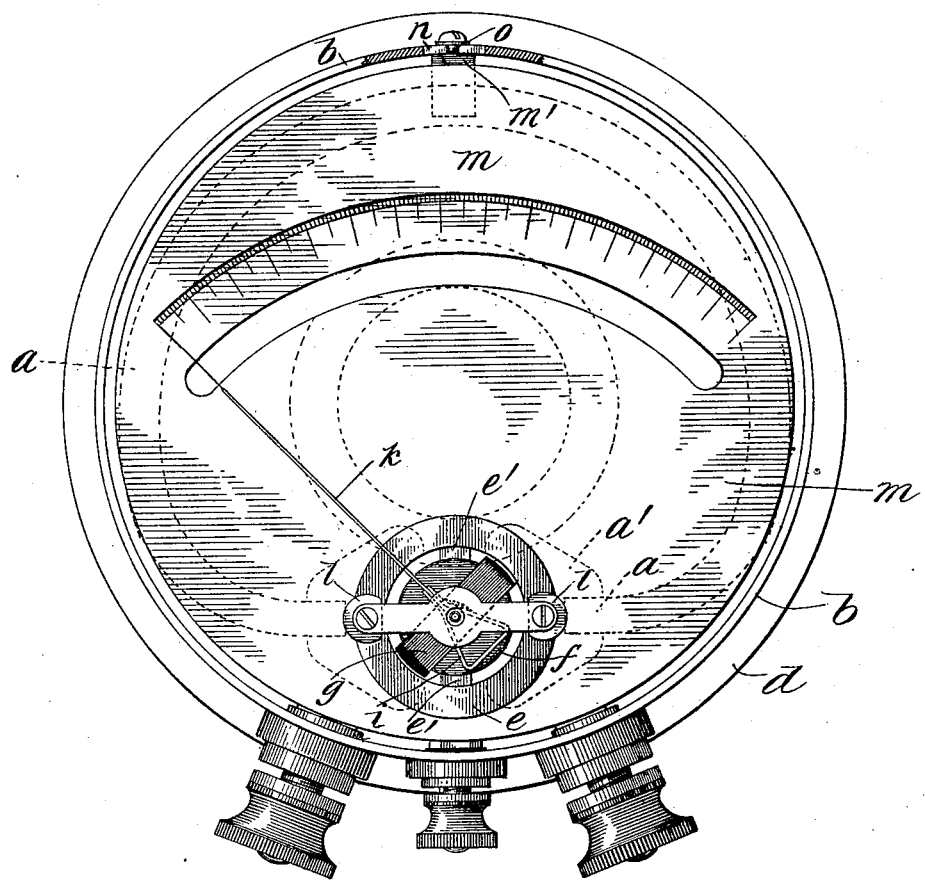

No. 631,871.  
Patented Aug. 29, 1899.

E. W. JEWELL.
ELECTRICAL MEASURING INSTRUMENT.
(Application filed Feb. 4, 1899.)

(No Model.)  
2 Sheets—Sheet 1.

Witnesses:

Inventor,
Edward W. Jewell,
By Barton & Brown
Attorneys.

No. 631,871. Patented Aug. 29, 1899.
E. W. JEWELL.
ELECTRICAL MEASURING INSTRUMENT.
(Application filed Feb. 4, 1899.)
(No Model.) 2 Sheets—Sheet 2.
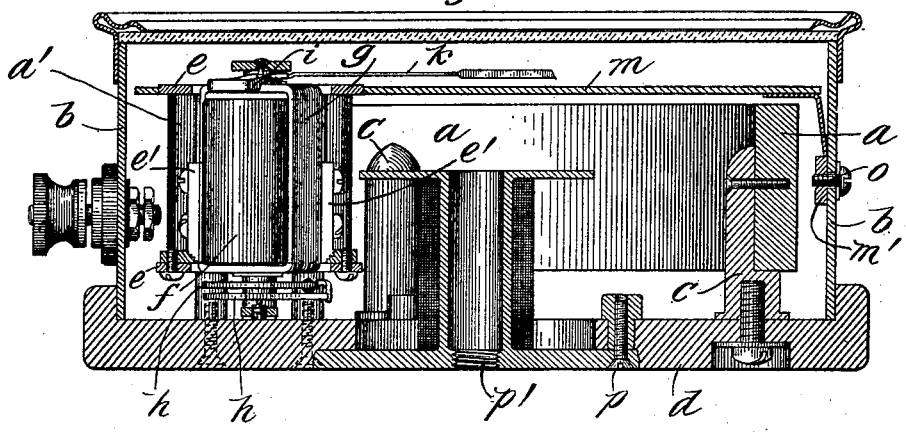
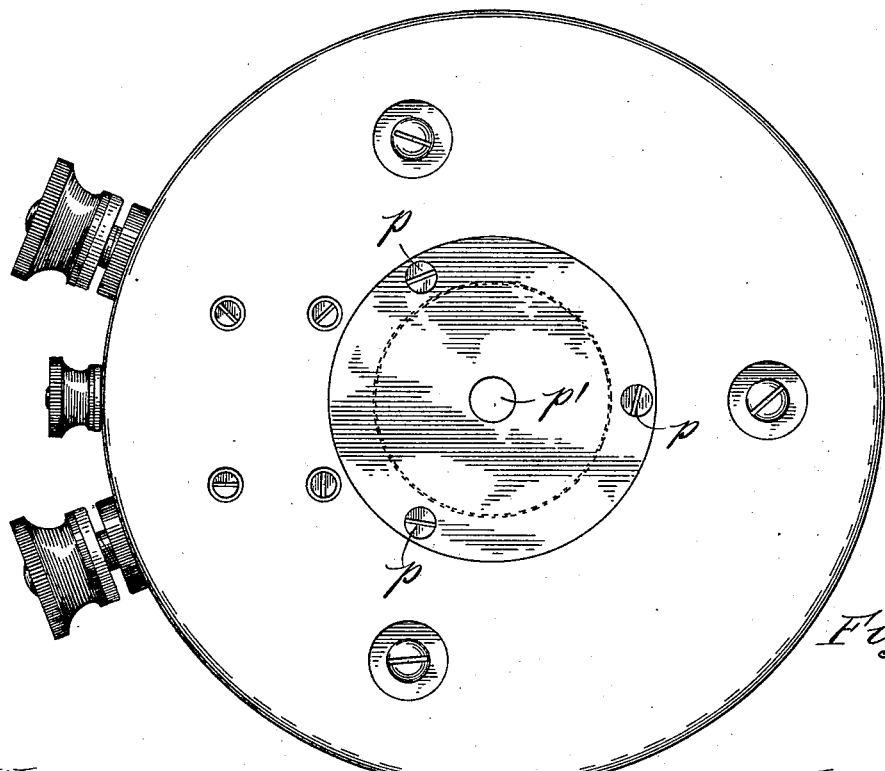
Witnesses:
Inventor,
Edward W. Jewell,
By Barton & Brown
Attorneys.

UNITED STATES PATENT OFFICE.

EDWARD W. JEWELL, OF CHICAGO, ILLINOIS.

ELECTRICAL MEASURING INSTRUMENT.

SPECIFICATION forming part of Letters Patent No. 631,871, dated August 29, 1899.

Application filed February 4, 1899. Serial No. 704,460. (No model.)

*To all whom it may concern:*

Be it known that I, EDWARD W. JEWELL, a citizen of the United States, residing at Chicago, in the county of Cook and State of Illinois, have invented a certain new and useful Improvement in Electrical Measuring Instruments, (Case No. 2,) of which the following is a full, clear, concise, and exact description.

My invention relates to an electrical measuring instrument, and is especially designed for application to portable instruments, such as ammeters and voltmeters.

My object has been primarily to produce a strong and durable instrument which will give correct readings under trying conditions and in spite of the more or less rough usage and knocking about to which portable instruments usually are subjected.

One feature of my invention consists in mounting the rotatable armature or measuring-coil in bearings which are fixedly secured to the pole-pieces of the field-magnet, a soft-iron core being also fixedly secured between the pole-pieces by non-magnetic brackets, the pole-pieces being thus mounted securely and the whole constituting a "movement" which may be removed from the magnet as a unit for the purpose of adjustment and repair.

A second feature consists in mounting the needle of the instrument in a novel manner upon the coil-spindle, so that it may be removed therefrom and replaced with ease and speed.

Thirdly I provide a dial for my instrument which is rotatably mounted concentrically with the axis of rotation of the coil with means for adjusting said dial in one direction or the other about said axis, so that should the indicator-needle become bent by an unusually hard knock it is but the work of a moment to set the dial back until it occupies the proper relative position.

Another feature lies in an improved arrangement of the springs which oppose the rotation of the coil and which serve to convey the current thereto.

Still another feature consists in providing means for easily removing and changing the resistance-spool, which is usually mounted within the casing of each instrument, without disturbing the working parts.

The foregoing will all be particularly described and further features of my invention will be set forth in connection with the accompanying drawings, which illustrate a measuring instrument embodying my said invention.

Figure 2:
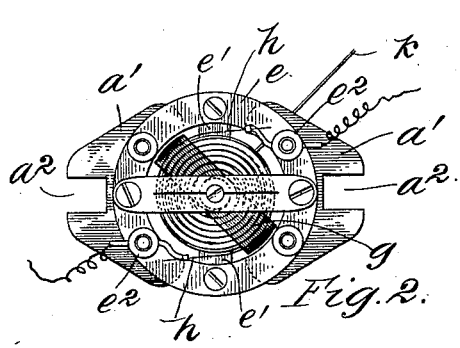
Figure 3:
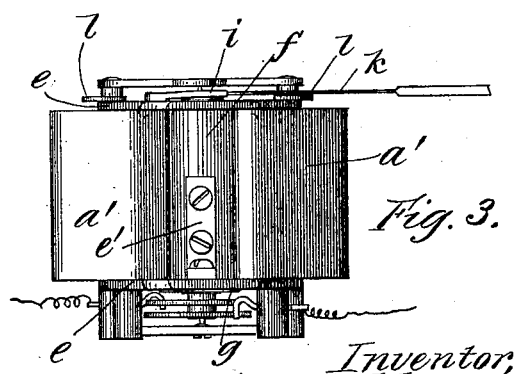

Figure 1 is a plan view of the instrument, the glass cover having been removed. Fig. 2 is a view of the movement from underneath. Fig. 3 is an elevation thereof. Fig. 4 is a sectional elevation of the instrument. Fig. 5 is a bottom view thereof.

The same parts are designated by similar letters of reference wherever they are shown.

The steel permanent magnet $a$, which furnishes the field of force, is supported within the casing $b$ upon standards $c$, secured to the base-plate $d$, which is preferably of hard rubber. The pole-pieces $a'$ $a'$ of the magnet $a$ have slots $a^2$ $a^2$ therein, into which the ends of the magnet are adapted to fit. At the top and bottom the pole-pieces are rigidly secured to annular frames $e$ $e$, of brass or other suitable non-magnetic material, and a cylindrical core $f$, of soft iron, is maintained between the pole-pieces concentrically to the curvature thereof by brackets $e'$ $e'$, fastened to the lower annular frame $e$.

The coil $g$ of the instrument is wound upon a rectangular frame encircling the core $f$, which frame is mounted on spindles delicately pivoted at the top and bottom in bearings supported by the annular frames $e$ $e$. Heretofore in the construction of measuring instruments it has been usual to mount the springs which oppose the rotation of the coil and which serve to connect the terminals of the coil with stationary conducting parts one at either end of the coil—that is, one at the top and one at the bottom. I have found that this impairs the proper working of the instrument, since there is a racking or twisting effort which tends to throw the coil out of alinement and which consequently produces an undue friction at the bearings of the coil-spindle. I have accordingly in my instrument mounted both springs $h$ $h$, which may be of even-tempered phosphor-bronze, at the lower end of the coil, insulating them from and fastening them to posts $e^2$ $e^2$, which are provided upon the lower annular frame $e$.

I have found that by this arrangement the sensitiveness of the instrument is greatly enhanced.

The pole-pieces, core, coil, and connected parts thus held together and mounted upon the annular frames $e\,e$ constitute a unit, which I refer to as the "movement" and which it is evident can be removed from the body of the instrument with great ease by simply sliding it off the projecting ends of the magnet $a$, which normally engage the slots $a^2$ of the pole-pieces. The movement may be held in position within the casing by screws passing through the hard-rubber base $d$ and into the posts $e^2$, which extend downward from the lower annular frame $e$ and rest upon the floor of the base.

It has been usual heretofore to attach the aluminium index-needle to the rotatable coil-spindle by a drop of cement or to otherwise permanently fasten it thereto. This I hold to be objectionable, since extreme care is necessary in handling the movement to prevent bending or breaking off the needle. In accordance with my invention I have permanently mounted a little spring-clip $i$ upon the coil-spindle, which clip is adapted to clamp and hold the needle quite firmly enough for the correct operation of the instrument, but which permits the needle to be removed in a moment whenever it may be necessary or convenient, as in adjusting the parts of the movement. I preferably form this spring-clip of a piece of metal, such as phosphor-bronze, in the shape of an isosceles triangle, as shown most clearly in Fig. 1. Here one leg of the triangle is cemented to the spindle, but extends out beyond the same and, with the other leg, constitutes a pair of jaws which serve effectively to clamp the needle $k$. The base of the triangle forms a counterbalance for the needle, as illustrated.

It frequently happens that the index-needle of a measuring instrument will be bent slightly, so that it will no longer point exactly to the zero-mark on the scale when the coil is at rest, but will point a short distance to the right or left of that mark. With the old-style instruments it was so difficult to straighten the needle without injuring the instrument in some way that the annoyance of recalculating each reading was endured rather than attempt to straighten the needle. I have provided a way out of this difficulty by mounting the dial $m$ rotatably concentric with the coil-spindle, so that should the needle become bent the dial may be carefully rotated until the index again points to zero when the coil is at rest. In the drawings I have illustrated the dial as being fitted over the upper annular frame $e$, rotatably thereon, and removably held in place by two little rotatable metal shields or guards $l\,l$. A slot $n$ is provided in the casing of the instrument, through which a screw $o$ is passed into an extension $m'$ of the dial. In order to adjust the latter it is only necessary to loosen the screw, move it to the right or left in the slot, as required, and then tighten it again, this simple operation serving effectively to compensate for the bends in the needle.

To provide convenient access to the resistance-spool, which usually is contained within the casings of measuring instruments, without the necessity of disturbing the movement, I have cut a hole in the back of the instrument, through which the spool may be inserted or withdrawn. The spool may be of brass, one end thereof being enlarged to abut against a countersunk portion of the back and may normally be held in position by screws $p\,p$. The short wires from the movement are led through the hole in the back of the casing and attached to the spool while it is removed therefrom. The wires are then pushed back into the casing, followed by the spool, and the latter is then secured in place by the screws $p\,p$, as illustrated. The back of the instrument thus presents the appearance of having a plate sunk into it, as shown in Fig. 5, this plate being really the end piece of the resistance-spool. A threaded hole $p'$ is provided in this plate or end piece, into which a bolt may be screwed to support the instrument upon a switchboard or elsewhere, if desired.

Having now particularly described a measuring instrument embodying the preferred form of my invention, I claim as new, and desire to secure by Letters Patent, the following:

1. In an electrical measuring instrument, the combination with a field-magnet, of removable pole-pieces fitting the ends thereof, framework in which said pole-pieces are rigidly mounted, a measuring-coil rotatably mounted between said pole-pieces, a core rigidly held in place between the pole-pieces and encircled by said coil, and springs connected with and opposing the rotation of said coil, said pole-pieces, framework, coil and springs thereby constituting a unit which may be adjusted upon or removed from the ends of said magnet as a single piece, substantially as described.

2. In an electrical measuring instrument, the combination with a field-magnet, of removable pole-pieces fitting the ends thereof, framework in which said pole-pieces are rigidly mounted, a measuring-coil rotatably mounted between said pole-pieces, a core rigidly held in place between the pole-pieces and encircled by said coil, and two springs mounted both at one end of the coil-spindle and adapted to oppose the rotation of the coil and spindle in a given direction, said springs being connected with and forming the terminals of the ends of said coil, substantially as described.

3. The combination with the rotating member of an electrical measuring instrument, of a spring-clip mounted thereon, and an index-needle removably held in position by said spring-clip, substantially as described.

4. The combination with the rotating spindle of an electrical measuring instrument, of a spring-clip substantially in the form of an isosceles triangle, one leg of said triangle being secured to the spindle and coacting with the other leg to form the jaws of the spring-clip, and an index-needle removably held in position between the jaws of said spring-clip, the base of said triangle constituting a counterbalance for the needle, substantially as described.

5. In an electrical measuring instrument, the combination with the rotating member thereof; of an index-needle actuated by said rotating member, a casing for the instrument, a portion having a scale marked thereon on which said needle is adapted to indicate the measurements of the instrument, said scale portion being adjustable from without the casing with respect to said needle and independently of the instrument to correct erroneous indications of the needle, substantially as described.

6. In an electrical measuring instrument, the combination with the rotatable member thereof; of an index-needle actuated thereby, and a dial having a scale marked thereon on which said index-needle is adapted to indicate the measurements of the instrument, said dial being rotatable with relation to the needle and independently of the instrument, the axis of rotation of said dial being substantially coincident with the axis of rotation of the rotatable member, substantially as described.

7. In an electrical measuring instrument, the combination with a field-magnet $a$, of a rotatably-mounted measuring-coil $g$, a core $f$ rigidly held in place, means for yieldingly opposing the rotation of the said coil, and a frame wherein the coil and core are mounted, provided with engaging parts removably fitting between the poles of the magnet, substantially as described.

8. In an electrical measuring instrument, the combination with a rotatable part $g$, of a needle $k$ actuated thereby, a dial $m$ provided with a scale upon which the measurements of the instrument are adapted to be read, a mounting for said dial concentric with the axis of rotation of said rotatable part $g$, and a screw $o$ engaging a relatively stationary part adapted to permit of the adjustment of the dial upon its concentric mounting with respect to the needle, substantially as described.

9. In an electrical measuring instrument, the combination with a magnet $a$, of a rotatable part $g$, a needle $k$ actuated thereby, a frame wherein parts $g$ and $k$ are mounted, removably fitting between the poles of the magnet, a dial $m$ provided with a scale upon which the measurements of the instrument are adapted to be read, a mounting for said dial concentric with the axis of rotation of said rotatable part $g$, and a screw $o$ engaging a relatively stationary part adapted to permit of the adjustment of the dial upon its concentric mounting with respect to the needle, substantially as described.

10. The combination with the casing of an electrical measuring instrument, said casing having an opening therein, a resistance-spool adapted to be inserted within the casing through said opening, said resistance-spool having its outer end of a larger diameter than said opening, and means for securing the outer end of said spool to the casing, substantially as and for the purpose set forth.

11. The combination with the casing of an electrical measuring instrument, said casing having an opening therein, a resistance-spool adapted to be inserted within the casing through said opening, said resistance-spool having its outer end of a larger diameter than said opening, said resistance-spool also having a threaded hole therein adapted to receive a bolt, whereby the instrument may be supported, and screws passing through the outer end of said spool and into the casing to fasten the spool in place, the spool thus presenting from the outside the appearance of a plate sunk into the casing, substantially as described.

In witness whereof I hereunto subscribe my name this 2d day of February, A. D. 1899.

EDWARD W. JEWELL.

Witnesses:
D. W. C. TANNER,
MINA L. SWARTWOUT.